United States Patent [19]

Crespy

[11] Patent Number: 4,477,149
[45] Date of Patent: Oct. 16, 1984

[54] RESETTABLE MIRROR ASSEMBLY

[76] Inventor: Serge Crespy, P.O. Box 383, Collingwood, Ontario, Canada, L9Y 3Z7

[21] Appl. No.: 485,326

[22] Filed: Apr. 15, 1983

[51] Int. Cl.³ .................................. G02B 7/18; G02B 5/08
[52] U.S. Cl. ...................................... 350/288; 248/542; 248/487; 116/320; 33/265; 33/1 N
[58] Field of Search ................. 350/288, 307; 248/487, 248/478, 474, 477, 542; 116/320; 33/265, 1 N

[56] References Cited

U.S. PATENT DOCUMENTS

| | | | |
|---|---|---|---|
| 2,685,859 | 8/1954 | Donnell | 248/542 |
| 3,024,049 | 3/1962 | Tranas | 287/87 |
| 3,421,728 | 1/1968 | Gordon | 248/477 |
| 3,439,646 | 4/1969 | Helle | |
| 3,513,807 | 5/1970 | Helle | 350/307 |
| 3,565,033 | 2/1971 | Helle | 248/481 |

Primary Examiner—Jon W. Henry
Attorney, Agent, or Firm—Kerkam, Stowell, Kondracki & Clarke

[57] ABSTRACT

A vehicle body side mirror assembly includes indicia arranged to facilitate resetting of the vehicle mirror to a previously determined position. The mirror assembly includes indicia such that the mirror assembly may be mounted on either the passenger or drivers side of a vehicle without modifications. Further, the indicia are arranged such that the mirror assembly may be readily reset to a previously determined position from outside of the vehicle as well as from inside of the vehicle. A support arm is pivotably attached or mounted to a base having circumferentially arranged indicia thereupon. The support arm is generally L-shaped and includes a lower portion having two indicia adapted for alignment with the circumferentially arranged indicia on the base, whereas a top portion of the support arm likewise includes two indicia for resetting a pivotably mounted mirror housing with respect to the support arm.

20 Claims, 4 Drawing Figures

RESETTABLE MIRROR ASSEMBLY

BACKGROUND OF THE INVENTION

This invention relates to a mirror assembly. More specifically, this invention relates to a vehicle body side mirror assembly which may be easily reset to a previously determined position.

The use of vehicle body side mirror assemblies is well-known in the art. Specifically, such mirror assemblies are mounted upon the driver and/or passenger side of a vehicle such that the driver may see vehicles behind him. Such mirror assemblies must of necessity be adjustable to various positions because of the wide variation in height and angle of sitting among the driving public.

A problem with vehicle body side mirror assemblies is that they generally require repeated trial and error in order to place them in proper alignment for a particular operator. It is time consuming in order to set the mirror assembly to a proper position.

The problems associated with setting such mirror assemblies are especially vexing when setting the passenger side mirror assembly. The vehicle operator must roughly adjust the passenger side mirror and then slide back to the driver side of the vehicle to determine if the setting is proper. It is then usually necessary to slide back to the passenger side of the vehicle to more properly adjust the mirror. Often, it will be necessary to slide back to the passenger side of the vehicle a third time in order to fine tune the setting of the mirror.

The necessity for resetting a mirror assembly for a vehicle often occurs as a result of going through a car or truck wash and then finding that the car washing brushes have knocked the mirror or mirrors out of their proper settings.

The problem of resetting mirrors to their proper settings is also especially troublesome when a vehicle is driven by more than one operator. If the two operators are different in height, it will usually be necessary to readjust the mirrors for the particular operator. Accordingly, if two people are taking turns driving, it is usually necessary to reset the vehicle body side mirror assemblies each time a new driver takes over, thus requiring the time consuming trial and error technique discussed above.

In response to the above noted problems, the prior art includes the following patents showing techniques for quickly readjusting a side mirror assembly to a predetermined position:

| U.S. Pat. No. | Inventor | Issuance Date |
| --- | --- | --- |
| 3,439,646 | Helle | April 22, 1969 |
| 3,513,807 | Helle | May 26, 1970 |
| 3,565,033 | Helle | February 23, 1971 |

The Helle patents show various constructions for vehicle side mirror assemblies including index markings for resetting the mirrors to a previously set position.

The following patents disclose various techniques for resetting a mirror to a preset or predetermined position:

| U.S. Pat. No. | Inventor | Issuance Date |
| --- | --- | --- |
| 2,685,859 | Donnell | August 10, 1954 |
| 3,024,049 | Tranas | March 6, 1962 |

-continued

| U.S. Pat. No. | Inventor | Issuance Date |
| --- | --- | --- |
| 3,421,728 | Gordon | January 14, 1969 |

The Donnell patent shows a mirror assembly including an indicating plate having indicia which cooperate with indicia upon a mirror frame in order to reset the mirror to a predetermined position.

The Tranas patent discloses a mirror construction including an adjustable swivel and having a number wheel to allow one to reset the mirror to a predetermined position.

The Gordon patent discloses an adjustable mirror including a horizontal position wheel for setting the horizontal angle of a mirror and a vertical number wheel for setting the vertical angle of the mirror.

Although the prior art mirror assemblies have been generally useful, they have often been subject to one or more of several disadvantages. In particular, such mirror assemblies often require extra parts, thereby increasing the complexity of construction. Additionally, other of the heretofore known mirror assemblies are difficult to reset to a predetermined position because of parallax error or lack of clarity of the indicia settings.

A further problem common to vehicle body side mirror assemblies which have features to facilitate quick resetting of the mirrors is that they often require different constructions for the driver side mirror assembly and the passenger side mirror assembly. Since one views a mirror assembly from a different angle depending whether it is mounted upon the driver side or passenger side of the vehicle, a construction which allows the resetting of the mirror assembly when mounted on the passenger side of the vehicle may not work if the mirror assembly is mounted on the driver side of the vehicle.

A further problem common to the prior art is that the schemes for returning the mirror assembly to a preset position often require that the vehicle operator must be inside of the vehicle in order to return the passenger side mirror assembly to a previously set position. However, if a truck driver's personal belongings or other goods are inside the vehicle on the passenger side, it may be difficult for the driver to reach over the goods and out the passenger side window to readjust the mirror. Alternately, it may be especially difficult to return the mirror assembly to its preset position if one is viewing the mirror assembly from outside the vehicle instead of viewing the mirror assembly from inside the vehicle. The angle of view from outside the vehicle may differ sufficiently from the inside angle as to deny one the proper perspective for resetting the mirror to a previously noted position.

A general object of the present invention is to provide a new and improved vehicle body side mirror assembly.

A more specific object of the present invention is to provide a vehicle body side mirror assembly which is relatively simple in construction and allows easy resetting of the mirror to a predetermined position.

Another object of the present invention is to provide a vehicle body side mirror assembly which works equally well whether attached to the passenger side or driver side of a vehicle.

A still further object of the present invention is to provide a vehicle body side mirror assembly which can easily be reset to a predetermined position even if one is outside of the vehicle.

SUMMARY OF THE INVENTION

The above and other objects of the present invention which will become apparent as the description proceeds are realized by a vehicle body side mirror assembly comprising: a base having a top surface and adapted to be attached to a vehicle body; a support arm having a lower end pivotly mounted to the base and having an upper end; a mirror assembly having a side surface pivotably mounted to the upper portion of the support arm; a mirror mounted in the mirror housing; cooperating mirror position adjustment indicia at the lower end of the support arm and on the base and operable to facilitate resetting of the support arm by pivoting to a previously determined position which resets the mirror to a corresponding previously determined position; and cooperating mirror angle adjustment indicia on the upper portion of the support arm and the side surface of the mirror housing and operable to facilitate resetting of the mirror housing by pivoting to a previously determined angle which resets the mirror to a corresponding previously determined angle. The support arm comprises a lower portion including the lower end and an upper portion including the upper end and extending at an angle with respect to said lower portion. The mirror position adjustment indicia includes at least a first position indicium on the lower portion of the support arm and a second position indicium on the lower portion of the support arm opposite the first position indicium. The mirror position adjustment indicia further includes a plurality of circumferentially arranged indicia on the top surface of the base. The mirror angle adjustment indicia includes at least a first angle indicium on the upper portion of the support arm and a second angle indicium on the upper portion of the support arm opposite the first angle indicium. The mirror angle adjustment indicia further includes a plurality of circumferentially arranged indicia on the side surface of the mirror housing. The upper portion of the support arm is perpendicular to the lower portion of the support arm and the lower portion of the support arm is constrained to pivot perpendicularly with respect to the top surface of the base. The upper portion of the support arm is constrained to be perpendicular to the side surface of the mirror housing. The mirror housing is constrained to pivot in a horizontal axis.

The vehicle body side mirror assembly according to the present invention may alternately be described as comprising: a base having a top surface and adapted to be attached to a vehicle body; a support arm having a lower portion adjustably mounted to the base and having an upper portion extending at an angle with respect to the lower portion; a mirror housing having a mounting surface pivotably mounted to the upper portion of the support arm; a mirror mounted to the mirror housing; cooperating mirror position adjustment indicia on the lower portion of the support arm and on the base and operable to facilitate the resetting of the lower portion of the support to a previously determined position which resets the mirror to a corresponding previously determined position; and cooperating mirror angle adjustment indicia on the upper portion of the support arm and on the side surface of the mirror housing and operable to facilitate the resetting of the mirror housing to a previously determined angle which resets the mirror to a corresponding previously determined angle; and wherein adjustment of the lower portion of the support arm with respect to the base causes the mirror housing to move in a path constrained to a horizontal plane.

BRIEF DESCRIPTION OF THE DRAWINGS

The above and other features of the present invention will be more readily understood when considered in conjunction with the following description and the drawings wherein like characters represent like parts throughout the several views and in which.

DETAILED DESCRIPTION OF THE PREFERRED EMBODIMENT

Figure 1:
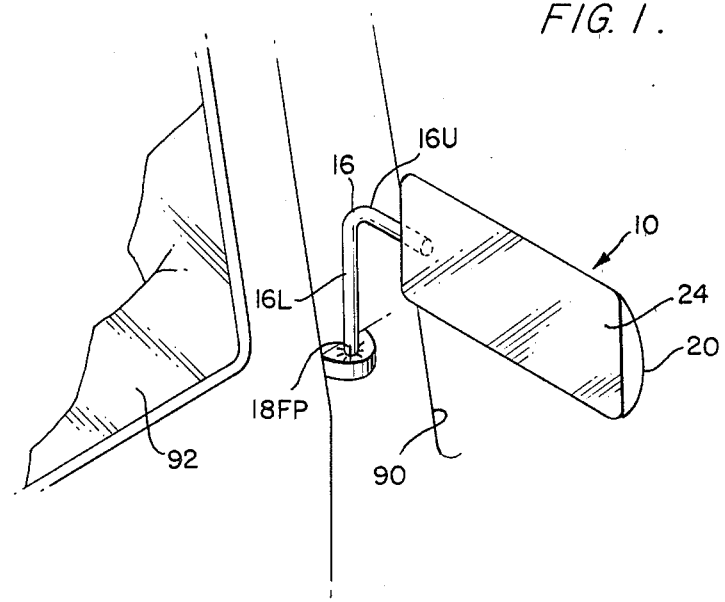
FIG. 1 shows a perspective view of a mirror assembly attached to the passenger side of a motor vehicle shown in broken away fashion.
Figure 2:
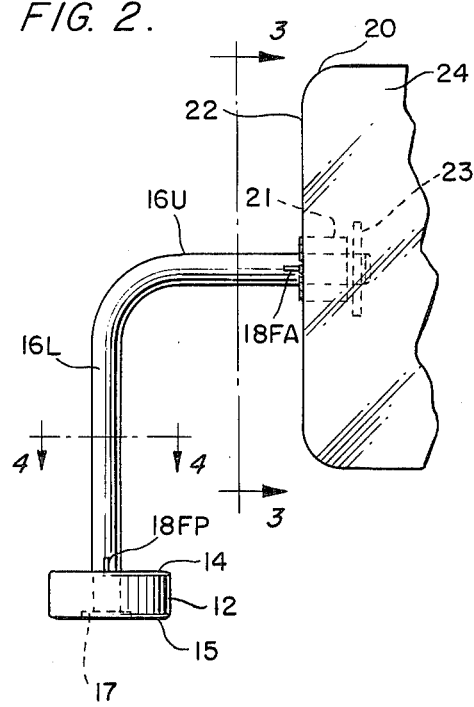
FIG. 2 shows a plane view of the mirror assembly.

Turning now to the figures, the preferred embodiment of a mirror assembly 10 according to the present invention will be discussed in detail. The mirror assembly 10 is shown in FIG. 1 attached to the passenger side of a vehicle 90 shown in broken away fashion. The mirror assembly 10 is adjacent the passenger side window 92 such that a vehicle operator may view the mirror 24 included within the mirror assembly 10 in order to determine if any vehicles are behind him.

The mirror assembly 10 includes a base 12 which is welded, bolted or otherwise affixed to the side of a motor vehicle such as 90. The base 12 includes a top surface 14 on which a support arm 16 is mounted. More specifically, a lower portion 16L of the L-shaped support arm 16 is pivotable with respect to the top surface 14 on which it is mounted. The L-shaped support arm 16 further includes an upper portion 16U extending at a right angle with respect to the lower portion 16L. A mirror housing 20 includes a side mounting surface 22 pivotably mounted to the upper portion 16U of the support arm 16. A mirror 24 is mounted to the mirror housing 20.

Figure 3:
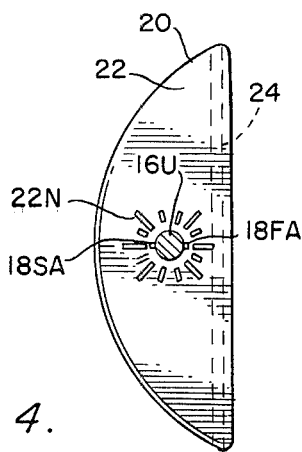
FIG. 3 shows a cross section view taken along lines 3—3 of FIG. 2.

As best shown in FIG. 3, the mirror housing 20 is concave and the mirror 24 is recessed slightly therein. The mirror 24 may be welded, adhered, or bolted into place.

The support arm lower portion 16L is pivotably adjustable with respect to the base 12. The lower portion 16L to pivots perpendicularly with respect to the top surface 14 of the base 12. In similar fashion, the mirror housing 20 is pivotable with respect to the support arm upper portion 16U.

The pivoting between the support arm lower portion 16L and the base 12 may be accomplished in a number of ways. For example, a bolt 17 may be attached to the lower end of support arm lower portion 16L and constrain this arm between the top surface 14 and bottom surface 15 of the base 12. Likewise, the pivotable arrangement between the support arm upper portion 16U and the mirror housing 20 may be accomplished in a number of ways. For example, a bearing portion 21 may be disposed within the mirror housing 20 to rotatably receive the upper portion 16U. A bolt 23 can be fixed to the upper portion 16U and prevent separation between support arm 16 and mirror housing 20.

The feature of the mirror assembly 10 as so far described are illustrative of a known mirror assembly since the present invention is an improvement upon this known mirror assembly structure.

Figure 4:
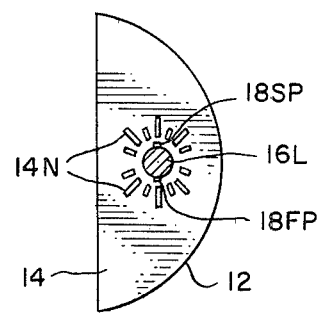
FIG. 4 shows a cross section view taken along lines 4—4 of FIG. 2.

The mirror assembly 10 according to the present invention includes cooperating mirror position adjustment indicia 14N on the top surface 14 of the base 12 and 18FP and 18SP on the support arm lower portion 16L. As best shown in FIG. 4, the indicia 14N are a plurality of circumferentially arranged indicia on the top surface 14 of the base 12 disposed around the support arm lower portion 16L. The indicia 14N and 18FP and 18SP allow one to reset the support arm lower portion 16L to a previously set position, this in turn resetting the mirror 24 to a previously determined position in which it moves as the support arm upper portion 16U is turned.

A plurality of circumferentially arranged indicia 22N are disposed around the support arm upper portion 16U (best seen in FIG. 3) in similar fashion to the arrangement of indicia 14N disposed around the support arm lower portion 16L. A first angle indicium 18FA is disposed on one side of the support arm upper portion 16U, whereas a second angle indicium 18SA is disposed opposite the first indicium 18FA. Together the indicia 22N and 18FA and 18SA constitute cooperating mirror angle adjustment indicia. By adjusting the relative position of the indicium 18FA (or 18SA) with respect to the circumferentially arranged indicia 22N, one may readily return the mirror housing 22 and the mirror 24 to a previously set position.

The operation of the present invention is relatively straight forward. Once the mirror assembly 10 has been placed in a proper position, the vehicle operator can readily note the position of indicium 18 FP with respect to indicia 14N and the position of indicia 18FA with respect to indicia 22N. If the mirror assembly 10 thereafter is displaced from this proper position, as by passage through a car or truck wash, the vehicle operator may readily reset the mirror assembly 10 to its proper position by returning indicium 18FP to its previously noted position with respect to indicia 14N and, likewise, returning the indicium 18FA to its previously noted position with respect to indicia 22N. The mirror 24 may thereby be easily reset to the proper position without the necessity of repeated trials and errors.

By including the indicium 18SP on the support arm lower portion 16L 180° from the indicium 18FP and the indicium 18SA 180° from the indicium 18FA on the support arm upper portion 16U, the mirror assembly 10 according to the present invention is equally well adapted for attachment to the driver and passenger sides of a vehicle. In particular, the indicia 18FP and 18FA would be used from inside the vehicle when the mirror assembly 10 is mounted on the passenger side of the vehicle (as shown in FIG. 1). However, if the mirror assembly 10 is mounted on the driver side of the vehicle, the indicia 18SP and 18SA will be readily visible from the interior of the vehicle to allow proper setting. In other words, the mirror assembly 10 according to the present invention is equally well adapted to mounting on the driver and passenger sides of the vehicle without modifications.

The inclusion of the indicia 18SP and 18SA are especially useful in facilitating the repositioning of the mirror assembly 10 from outside of the vehicle. For example, if the passenger side of the vehicles front seat is filled with luggage, it may be very inconvenient to slide over to the passengers side to readjust a mirror assembly 10 mounted to the passengers side. Since the indicia 18SP is 180° removed from the indicia 18FB, one can readily set the mirror assembly position by viewing the indicium 18SP from the front of the mirror assembly 10 and outside of the vehicle. Likewise, the indicium 18SA allows one to set the angle of the mirror housing 20 and the mirror 24 affixed thereto from the front side of the mirror assembly 10. The mirror assembly 10 may easily be set in position from inside or outside of the vehicle.

The base 12, support arm 16, and mirror housing 20 may be composed of steel or other metals, fiber reinforced plastic, or other materials.

The various indicia may be realized by painted graduations, decals, engraving, or even pieces of plastic adhered to the base 12, support arm 16, and mirror housing 20. If desired, the indicia 14N and 22N may include numerals. The indicia 14N and 22N respectively on top surface 14 and side surface 22 could be constructed as a plastic indicator ring adhered to the corresponding surface. The indicia 18FA, 18SA, 18FP, and 18SP could be constructed as two rings mounted on support arm 16, each ring having two windows 180° apart. The windows would rotate with support arm 16, each window constituting one of the indicia 18FA, 18SA, 18FP, and 18SP on the support arm 16.

Although the present invention has been described with respect to particular structures, modifications will be readily apparent to those of ordinary skill in the art. Accordingly, the scope of the present invention should be determined with reference to the claims appended hereto.

What is claimed is:

1. A vehicle body side mirror assembly comprising:
   a base having a top surface and adapted to be attached to a vehicle body;
   a support arm having a lower end pivotably mounted to said base and having an upper end;
   a mirror housing having a side surface pivotably mounted to said upper end of said support arm;
   a mirror mounted to said mirror housing;
   cooperating mirror position adjustment indicia at said lower end of said support arm and on said base and operable to facilitate resetting of said support arm by pivoting to a previously determined position which resets said mirror to a corresponding previously determined position; and
   cooperating mirror angle adjustment indicia at said upper end of said support arm and said side surface of said mirror housing and operable to facilitate resetting of said mirror housing by pivoting to a previously determined angle which resets said mirror to a corresponding previously determined angle.

2. The vehicle body side mirror assembly of claim 1 wherein said support arm comprises a lower portion including said lower end and an upper portion including said upper end and extending at an angle with respect to said lower portion.

3. The vehicle body side mirror assembly of claim 2 wherein said mirror position adjustment indicia includes at least a first position indicium on said lower portion of said support arm and a second position indicium on said lower portion of said support arm opposite said first position indicium.

4. The vehicle body side mirror assembly of claim 3 wherein said mirror position adjustment indicia includes a plurality of circumferentially arranged indicia on said top surface of said base.

5. The vehicle body side mirror assembly of claim 4 wherein said mirror angle adjustment indicia includes at least a first angle indicium on said upper portion of said support arm and a second angle indicium on said upper portion of said support arm opposite said first angle indicium.

6. The vehicle body side mirror assembly of claim 5 wherein said mirror angle adjustment indicia includes a plurality of circumferentially arranged indicia on said side surface of said mirror housing.

7. The vehicle body side mirror assembly of claim 2 wherein said mirror angle adjustment indicia includes at least a first angle indicium on said upper portion of said support arm and a second angle indicium on said upper portion of said support arm opposite said first angle indicium.

8. The vehicle body side mirror assembly of claim 7 wherein said mirror angle adjustment indicia includes a plurality of circumferentially arranged indicia on said side surface of said mirror housing.

9. The vehicle body side mirror assembly of claim 2 wherein said upper portion of said support arm is perpendicular to said lower portion of said support arm, and said lower portion of said suppport arm is constrained to pivot perpendicularly with respect to said top surface of said base.

10. The vehicle body side mirror assembly of claim 9 wherein said mirror housing is constrained to pivot in a horizontal axis.

11. The vehicle body side mirror assembly of claim 9 wherein said mirror position adjustment indicia includes a plurality of indicia on said top surface of said base.

12. The vehicle body side mirror assembly of claim 11 wherein said mirror position adjustment indicia includes at least a first position indicium on said lower portion of said support arm and second position indicium on said lower portion of said support arm opposite said first position indicium.

13. The vehicle body side mirror assembly of claim 12 wherein said mirror angle adjustment indicia includes at least a first angle indicium on said upper portion of said support arm and a second indicium on said upper portion of said support arm opposite said first angle indicium.

14. A vehicle body side mirror assembly comprising:
base housing a top surface and adapted to be attached to a vehicle body;
a support arm having a lower portion adjustably mounted to said base and having an upper portion extending at an angle with respect to said lower portion;
a mirror housing having a mounting surface pivotably mounted to said upper portion of said support arm;
a mirror mounted to said mirror housing;
cooperating mirror position adjustment indicia on said lower portion of said support arm and on said base and operable to facilitate the resetting of said lower portion of said support arm to a previously determined position which resets said mirror to a corresponding previously determined position; and
cooperating mirror angle adjustment indicia on said upper portion of said support arm and on said side surface of said mirror housing and operable to facilitate the resetting of said mirror housing to a previously determined angle which resets said mirror to a corresponding previously determined angle; and
wherein adjustment of said lower portion of said support arm with respect to said base causes said mirror housing to move in a path constrained to a horizontal plane.

15. The vehicle body side mirror assembly of claim 14 wherein said mirror angle adjustment indicia includes at least a first angle indicium on said upper portion of said support arm and a second angle indicium on said upper portion of said support arm opposite said first angle indicium.

16. The vehicle body side mirror assembly of claim 15 wherein said mirror angle adjustment includes a plurality of circumferentially arranged indicia on said mounting surface of said mirror housing.

17. The vehicle body side mirror assembly of claim 16 wherein said mirror position adjustment indicia includes at least a first position indicium on said lower portion of said support arm and a second position indicium on said lower portion of said support arm opposite said first position indicium.

18. The vehicle body side mirror assembly of claim 17 wherein said mirror position adjustment indicia includes a plurality of circumferentially arranged indicia on said top surface of said base.

19. The vehicle body side mirror assembly of claim 14 wherein said mirror position adjustment indicia includes at least a first position indicium on said lower portion of said support arm and a second position indicium on said lower portion of said support arm opposite said first position indicium.

20. The vehicle body side mirror assembly of claim 19 wherein said mirror angle adjustment indicia includes at least a first angle indicium on said upper portion of said support arm and a second angle indicium on said upper portion of said support arm opposite said first angle indicium.

* * * * *